(12) United States Patent
Iddan et al.

(10) Patent No.: US 7,224,384 B1
(45) Date of Patent: May 29, 2007

(54) 3D IMAGING SYSTEM

(75) Inventors: Gavriel J. Iddan, Haifa (IL); Giora Yahav, Haifa (IL); Ori J. Braun, Palo-Alto, CA (US)

(73) Assignee: 3DV Systems Ltd., Yokneam Ilit (IL)

( * ) Notice: Subject to any disclaimer, the term of this patent is extended or adjusted under 35 U.S.C. 154(b) by 0 days.

(21) Appl. No.: 10/070,774

(22) PCT Filed: Sep. 8, 1999

(86) PCT No.: PCT/IL99/00490

§ 371 (c)(1),
(2), (4) Date: Sep. 4, 2002

(87) PCT Pub. No.: WO01/18563

PCT Pub. Date: Mar. 15, 2001

(51) Int. Cl.
*H04N 9/04* (2006.01)
*H04N 5/225* (2006.01)

(52) U.S. Cl. ............................................ 348/207.99

(58) Field of Classification Search ............... 348/353, 348/354, 572, 574, 576, 584, 607, 263, 362, 348/364, 229; 382/362, 154, 285, 274, 286, 382/148, 293, 276, 106; 356/375, 352, 237, 356/376, 601, 511, 23, 608, 607; 396/89, 396/106

See application file for complete search history.

(56) References Cited

U.S. PATENT DOCUMENTS

| | | | | |
|---|---|---|---|---|
| 4,166,280 A | * | 8/1979 | Poole | 348/263 |
| 4,597,015 A | | 6/1986 | Johnson | |
| 5,157,451 A | * | 10/1992 | Taboada et al. | 356/5.05 |
| 5,198,657 A | | 3/1993 | Trost et al. | |
| 5,434,612 A | | 7/1995 | Nettleton et al. | |
| 5,576,948 A | * | 11/1996 | Stern et al. | 700/59 |
| 6,157,409 A | | 12/2000 | Riches | |
| 6,233,049 B1 | * | 5/2001 | Kondo et al. | 356/376 |
| 6,278,847 B1 | * | 8/2001 | Gharib et al. | 396/324 |
| 6,504,569 B1 | * | 1/2003 | Jasinschi et al. | 348/43 |
| 6,603,103 B1 | * | 8/2003 | Ulrich et al. | 250/205 |
| 2001/0055482 A1 | * | 12/2001 | Braun et al. | 396/89 |

FOREIGN PATENT DOCUMENTS

| | | |
|---|---|---|
| EP | 0 353 200 | 1/1990 |
| EP | 0 750 202 | 12/1996 |
| EP | 0 777 134 | 6/1997 |
| WO | WO 95/30928 | 11/1995 |
| WO | WO 97/01111 | 1/1997 |
| WO | WO 97/01112 | 1/1997 |
| WO | WO 97/01113 | 1/1997 |
| WO | WO 99/40478 | 8/1999 |
| WO | WO 00/19705 | 4/2000 |

* cited by examiner

OTHER PUBLICATIONS

Azuma, T. et al.; "Real-Time Active Range Finder Using Light Intensity Modulation;" Jan. 1999; SPIE; vol. 3640; pp. 11-20.

*Primary Examiner*—Tung Vo
*Assistant Examiner*—Behrooz Senfi

(57) ABSTRACT

An optical imaging system comprising: a taking lens system that collects light from a scene being imaged with the optical imaging system; a 3D camera comprising at least one photosurface that receives light from the taking lens system simultaneously from all points in the scene and provides data for generating a depth map of the scene responsive to the light; and an imaging camera comprising at least one photosurface that receives light from the taking lens system and provides a picture of the scene responsive to the light.

28 Claims, 5 Drawing Sheets

3D IMAGING SYSTEM

RELATED APPLICATIONS

The present application is a U.S. national application of PCT/IL99/00490, filed Sep. 8, 1999.

FIELD OF THE INVENTION

The invention relates to cameras that provide an image of a scene and measurements of distances to regions in the scene.

BACKGROUND OF THE INVENTION 3D cameras that provide distance measurements to objects and points on objects that they image are well known in the art. Gated 3D cameras comprise a photosensitive surface, such as a CCD or CMOS camera, hereinafter referred to as a "photosurface", and a gating means for gating the camera open and closed, such as an electro-optical shutter or a gated image intensifier. To image a scene and determine distances from the camera to objects in the scene, the scene is generally illuminated with a train of light pulses radiated from an appropriate light source. Generally, the radiated light pulses are infrared (IR) light pulses. For each radiated light pulse in the train, following an accurately determined delay from the time that the light pulse is radiated, the camera is gated open for a period of time, hereinafter referred to as a "gate". Light from the light pulse that is reflected from an object in the scene is imaged on the photosurface of the camera if it reaches the camera during the gate. Since the time elapsed between radiating a light pulse and the gate that follows it is known, the time it took imaged light to travel from the light source to the reflecting object in the scene and back to the camera is known. The time elapsed is used to determine the distance to the object.

In some of these 3D cameras, only the timing between light pulses and gates is used to determine distance from the 3D camera to a region in the scene imaged on a pixel of the photosurface of the 3D camera. In others, the amount of light registered by the pixel during the time that the camera is gated open is also used to determine the distance. In 3D cameras in which the amount of light is used to determine distances to the imaged region, the amount of light registered on a pixel is sometimes corrected for reflectivity of the imaged region, dark current and background light. The accuracy of measurements made with these 3D cameras is a function of the rise and fall times and jitter of the light pulses and their flatness, and how fast the gating means can gate the camera open and closed.

Gated 3D cameras that determine distances to objects in a scene that they image responsive to amounts of light registered on pixels of photosurfaces comprised in the 3D cameras are described in PCT Publications WO 97/01111, WO 97/01112, and WO 97/01113, the disclosures of which are incorporated herein by reference.

A gated 3D camera as shown in WO 97/01111 comprises first and second homologous photosurfaces and a light source that illuminates a scene being imaged with the camera with a train of, preferably IR, light pulses. The first photosurface, hereinafter referred to as a "distance photosurface", is gated on with a short gate following the time that each light pulse in the pulse train is radiated. The portion of light from each light pulse in the pulse train that is reflected by a region of the scene and enters the 3D camera, which is registered on a pixel of the distance photosurface, is a function of the distance of the region from the pixel. The second photosurface, hereinafter referred to as a "normalization photosurface", is preferably not gated. The portion of light from each light pulse in the pulse train that is reflected by a region of the scene and enters the 3D camera, which is registered on a pixel of the normalization photosurface, is independent of the distance of the region from the pixel. The amount of light registered on the pixel is a measure of the total amount of light reaching the camera from the imaged region. An amount of reflected light registered on a pixel of the distance photosurface from all the light pulses in the pulse train is normalized to an amount of reflected light from all the light pulses registered on a corresponding pixel in the normalization photosurface. Normalized amounts of light are used to determine distances to regions in the scene.

U.S. Pat. No. 5,434,612 to Nettleton, the disclosure of which is incorporated herein by reference, describes a gated 3D camera comprising first, second and third photosurfaces. A scene imaged with this camera is not illuminated with a train of light pulses but with a single light pulse from a laser and the three photosurface are gated with respect to the time that the light pulse is radiated. The first photosurface is a distance photosurface. It is gated with a short gate so that a portion of the light pulse reflected by a region of the scene that is collected by the camera and registered on a pixel of the photosurface is a function of the distance of the region from the pixel. The second photosurface is a normalization photosurface. It is gated with a long gate so that the amount of reflected laser light registered on a pixel of the photosurface from an imaged region is a measure of the total amount of light reaching the camera from the imaged region. The third photosurface is used to measure background light by measuring the amount of light reaching the camera in a band of wavelengths near to wavelengths of light radiated by the laser. A filter that transmits light in the band of wavelengths close to the wavelengths of the laser light but blocks light having a wavelength the same as a wavelength of light radiated by the laser shields the third photosurface. The third photosurface is gated simultaneously with the normalization photosurface by a long gate having a same gate width as the gat that gates the second photosurface. A photosurface used to measure background light is hereinafter referred to as a "background photosurface".

Amounts of light registered on the background photosurface are used to correct the amounts of light registered on pixels of the distance and normalization photosurfaces for background light. Background corrected amounts of light registered by pixels on the normalization photosurface are used to normalize background corrected amounts of light registered by pixels on the distance photosurface. Distances to regions in the scene are determined from the background corrected normalized amounts of light registered by pixels on the distance photosurface.

Generally photosurfaces used in 3D cameras are gated by an external fast shutter. Certain types of CCD cameras allow for gating image acquisition on and off during a frame by turning the photosurfaces on and off. However, turn-on and turn-off times of these photosurfaces are generally much too long to enable gating the photosurfaces for the purposes of accurate distance measurements by turning them on and off. Typically turn-on and turn-off times for CCD photosurfaces are on the order of microseconds while gating for accurate distance measurements requires turn-on and turn-off times on the order of nano-seconds or less.

An electro-optical shutter suitable for use in 3D cameras, such as those described in the cited patent and patent applications is described in PCT Publications WO 99/40478, the disclosure of which is incorporated herein by reference.

Generally, a 3D camera is used in conjunction with an imaging camera, such as a video camera, that provides an image, hereinafter referred to as a "picture", of a scene being imaged with the 3D camera responsive to visible light from the scene. The 3D camera provides a "depth map" of the scene while the imaging camera provides a picture of the scene. Distances provided by the depth map are associated with visible features in the picture. In some applications distances associated with a picture of a scene are used to "window" the scene and remove unwanted features and/or objects in the scene, such as for example a background, from the picture. Such applications are described in PCT publication in WO 97/01111 cited above.

PCT patent application PCT/IL98/00476, entitled "Distance Measurement with a Camera", by some of the same inventors as the inventors of the present invention, the disclosure of which is incorporated herein by reference, describes a photosurface comprising pixels each of which has its own circuit that is controllable to gate the pixel on or off. A single photosurface of this type is useable to simultaneously provide the functions of a distance, background, and normalization photosurface of a 3D camera as well as an imaging camera. However, as the number of functions that the photosurface performs increases, the resolution of the photosurface decreases.

It is advantageous to have a simple robust optical system comprising a 3D camera and an imaging camera that is easily adjustable to simultaneously optimize quantities of light available from a scene imaged by the system that reach the cameras.

SUMMARY OF THE INVENTION

An aspect of some preferred embodiments of the present invention relates to providing an improved optical system, hereinafter referred to as a "3D imager", comprising a 3 D camera and an imaging camera, for acquiring depth maps and picture of a scene.

An aspect of some preferred embodiments of the present invention relates to providing a 3D imager that is relatively easily adjusted so that its 3D and imaging cameras may simultaneously receive optimum amounts of light available from a scene being imaged with the 3D imager.

An aspect of some preferred embodiments of the present invention relates to providing a 3D imager comprising an improved gating system for gating photosurfaces comprised in its 3D camera.

A 3D imager, in accordance with some preferred embodiments of the present invention, comprises a single taking lens boresighted with a gated 3D camera and an imaging camera. Preferably, the imaging camera is a color camera. Preferably the 3D camera comprises three photosensitive surfaces, a distance photosurface, a normalization photosurface and a background photosurface. Preferably, the 3D imager is used with a pulsed IR light source that illuminates a scene being imaged with the 3D imager with a train of preferably IR, light pulses. Light from the light pulses reflected by objects in the scene is used by the 3D camera to provide a depth map of the scene. Visual light from the scene is used by the imaging camera to provide a picture of the scene.

While there is usually more than ample amount of visible light available to form a quality picture of the scene, the quantity of light available for the purpose of providing a depth map of the scene is usually small. As a result, the 3D imager usually requires that the taking lens be set to a much higher f-number to produce a quality picture of the scene than an f-number required to provide accurate distance measurements to the scene.

To provide proper control of the amounts of light reaching the 3D camera and the imaging camera, the 3D imager comprises a system that controls the amount of light reaching the imaging camera from the taking lens independently of the amount of light reaching the 3D camera.

Preferably, the 3D camera comprises at least two irises. A first iris of the at least two irises controls the amount of visible light collected by the taking lens that reaches the imaging camera. A second iris controls either the amount of IR light collected by the taking lens that reaches the 3D camera or the total amount of IR and visible light collected by the taking lens that enters the 3D imager. As a result, the 3D imager can be adjusted to control independently amounts of light reaching the imaging camera and the 3D camera from a scene being imaged with the 3D imager. Therefore, subject to a level of illumination of the scene, a 3D imager, in accordance with a preferred embodiment of the present invention, is adjustable to simultaneously optimize the amounts of light from the scene that reach its 3D and imaging cameras.

In accordance with some preferred embodiments of the present invention all photosurfaces comprised in the 3D camera are gated with a same single fast shutter. This substantially simplifies the construction and control of the 3D imager. Preferably the 3D camera comprises three photosurfaces, a distance photosurface, a background photosurface and a normalized photosurface. The three photosurfaces are independently controllable to the turned on and off. Preferably, all light transmitted from the taking lens to the 3D camera passes through the single fast shutter. After passing through the shutter, portions of the light arc directed to each of the three photosurfaces, for example by a prism. Preferably, the prism is a totally internal reflection (TIR) prism. At any given time, to determine which of the photosurfaces is gated by the fast shutter, all photosurfaces except a photosurface that is to be gated by the fast shutter are shut off.

It is to be noted that whereas the photosurfaces are controllable to be turned on or off, the speed with which a photosurface can be switched between on and off states is generally not fast enough to gate the photosurfaces for the purposes of accurate distance measurements. Therefore, for 3D cameras, gating photosurfaces by turning them on and off is generally not practical.

In some preferred embodiments of the present invention, the 3D camera and associated optical components are housed as a single unit, hereinafter referred to as a "3D module". The 3D module comprises portals for optically coupling a taking lens and imaging camera to the 3D module using methods and techniques known in the art. In some preferred embodiments of the present invention, the 3D camera, imaging camera and associated electrical and optical components are integrated together as a single unit to which a taking lens is optically coupled.

There is therefore provided, in accordance with a preferred embodiment of the present invention an optical imaging system comprising: a taking lens system that collects light from a scene being imaged with the optical imaging system; a 3D camera comprising at least one photosurface that receives light from the taking lens system simultaneously from all points in the scene and provides data for generating a depth map of the scene responsive to the light; and an imaging camera comprising at least one photosurface that receives light from the taking lens system and provides a picture of the scene responsive to the light.

Preferably, the 3D camera and the imaging camera are boresighted with the taking lens system. Additionally or alternatively, the at least one photosurface of the 3D camera and the at least one photosurface of the imaging camera are preferably homologous.

In some preferred embodiments of the present invention, an optical imaging system comprises a light controller adjustable to control the amount of light from the taking lens system that reaches the imaging camera without affecting the amount of light from the taking lens system that reaches the 3D camera. Preferably, the light controller comprises an iris. Alternatively, the light controller preferably comprises a neutral density filter.

In some preferred embodiments of the present invention, an optical imaging system comprises a light controller adjustable to control the amount of light collected by the taking lens system that enters the imaging system. Preferably, the light controller comprises an iris.

In some preferred embodiments of the present invention, an optical imaging system comprises a light controller adjustable to control the amount of light from the taking lens system that reaches the 3D camera without affecting the amount of light from the taking lens that reaches the imaging camera. Preferably, the light controller comprises an iris.

The 3D camera in an optical imaging system in accordance with some preferred embodiment of the present invention is a gated 3D camera. Preferably, the optical imaging system comprises a pulsed light source that radiates a train of light pulses to illuminate a scene being imaged with the optical imaging system. Preferably, the pulsed light source radiates IR light.

According to some preferred embodiments of the present invention, the 3D camera comprises at least 2 photosurfaces. Preferably, the 3D camera comprises a light guide that receives light from the taking lens system and directs portions of the light that is receives to each of the at least two photosurfaces. Preferably, the 3D camera comprises a single shutter, which when gated open enables light from the taking lens system to reach the light guide.

The optical imaging system preferably comprises a controller that gates the single shutter open and closed. Preferably, the controller controls each of the photosurfaces to be activated and deactivated and wherein when a photosurface is activated, it is sensitive to light incident thereon. Preferably, the controller gates on the single shutter it activates one and only one of the at least two photosurfaces.

Preferably, the at least two photosurfaces comprises three photosurfaces. Preferably, following a time that at least one light pulse is radiated, the controller gates on the single shutter for a first gate and turns on a first photosurface and the first gate is timed so that light reflected from the at least one light pulse by a region in the scene is registered by the first photosurface.

Following a time that at least one light pulse in the train of light pulses is radiated, the controller preferably gates on the single shutter for a second gate and activates a second one of the photosurfaces and the second gate is timed so that during the second gate no light from the at least one light pulse reflected by the region is registered by the second photosurface.

Preferably, following a time that at least one light pulse in the train of light pulses is radiated the controller gates on the single shutter for a third gate and activates a third one of the photosurfaces and the controller controls the gate width and timing of the third gate so that during the third gate substantially all light from the at least one pulse that is reflected by the region, which is collected by the taking lens system, is registered by the third photosurface.

In some preferred embodiments of the present invention the light guide of the 3D camera is a three-way prism.

Some optical imaging systems in accordance with preferred embodiments of the present invention comprise a beam splitter that receives light from the taking lens system and directs a portion of the received light towards the 3D camera and a portion of the received light to the imaging camera.

In some preferred embodiments of the present invention the light guide of the 3D camera is a four-way prism that receives light from the taking lens system and directs a portion of the received light to the imaging camera.

In some preferred embodiments of the present invention the imaging camera comprises a color camera.

In some optical imaging systems, in accordance with preferred embodiments of the present invention, the imaging camera is a color camera comprising separate R, G and B photosurfaces and the imaging system comprises a four way prism that receives light from the taking lens system and directs a portion of the received light to each of the R, G and B photosurfaces and to the single shutter of the 3D camera.

There is further provided in accordance with a preferred embodiment of the present invention a gated 3D camera comprising: a taking lens system that collects light from a scene imaged with the 3D camera; at least 2 photosurfaces; a light guide that receives light from the taking lens and directs portions of the light that it receives to each of the at least two photosurfaces; and a single shutter, which when gated enables light from the taking lens system to reach the light guide.

Preferably, the controller controls each of the photosurfaces to be activated and deactivated and wherein when a photosurface is activated, it is sensitive to light incident thereon. Preferably, each time that the controller gates on the single shutter it activates one and only one of the at least two photosurfaces. Preferably, the at least two photosurfaces comprises three photosurfaces.

The 3D camera preferably comprises a light source that radiates a train of light pulses to illuminate a scene being imaged with the 3D camera. Preferably, following a time that at least one light pulse is radiated, the controller gates on the single shutter for a first gate and turns on a first photosurface and the first gate is timed so that light reflected from the at least one light pulse by a region in the scene is registered by the first photosurface.

Preferably, following a time that at least one light pulse in the train of light pulses is radiated, the controller gates on the single shutter for a second gate and activates a second one of the photosurfaces and the second gate is timed so that during the second gate no light from the at least one light pulse reflected by the region is registered by the second photosurface.

Preferably, following a time that at least one light pulse in the train of light pulses is radiated, the controller gates on the single shutter for a third gate and activates a third one of the photosurfaces and the controller controls the gate width and timing of the third gate so that during the third gate substantially all light from the at least one pulse that is reflected by the region, which is collected by the taking lens system, is registered by the third photosurface.

BRIEF DESCRIPTION OF FIGURES

The invention will be more clearly understood by reference to the following description of preferred embodiments thereof read in conjunction with the figures attached hereto. In the figures, identical structures, elements or parts which appear in more than one figures are labeled with the same numeral in all the figures in which they appear. Dimensions of components and features shown in the figures are chosen for convenience and clarity of presentation and are not necessarily shown to scale. The figures are listed below.

DETAILED DESCRIPTION OF PREFERRED EMBODIMENTS

Figure 1:
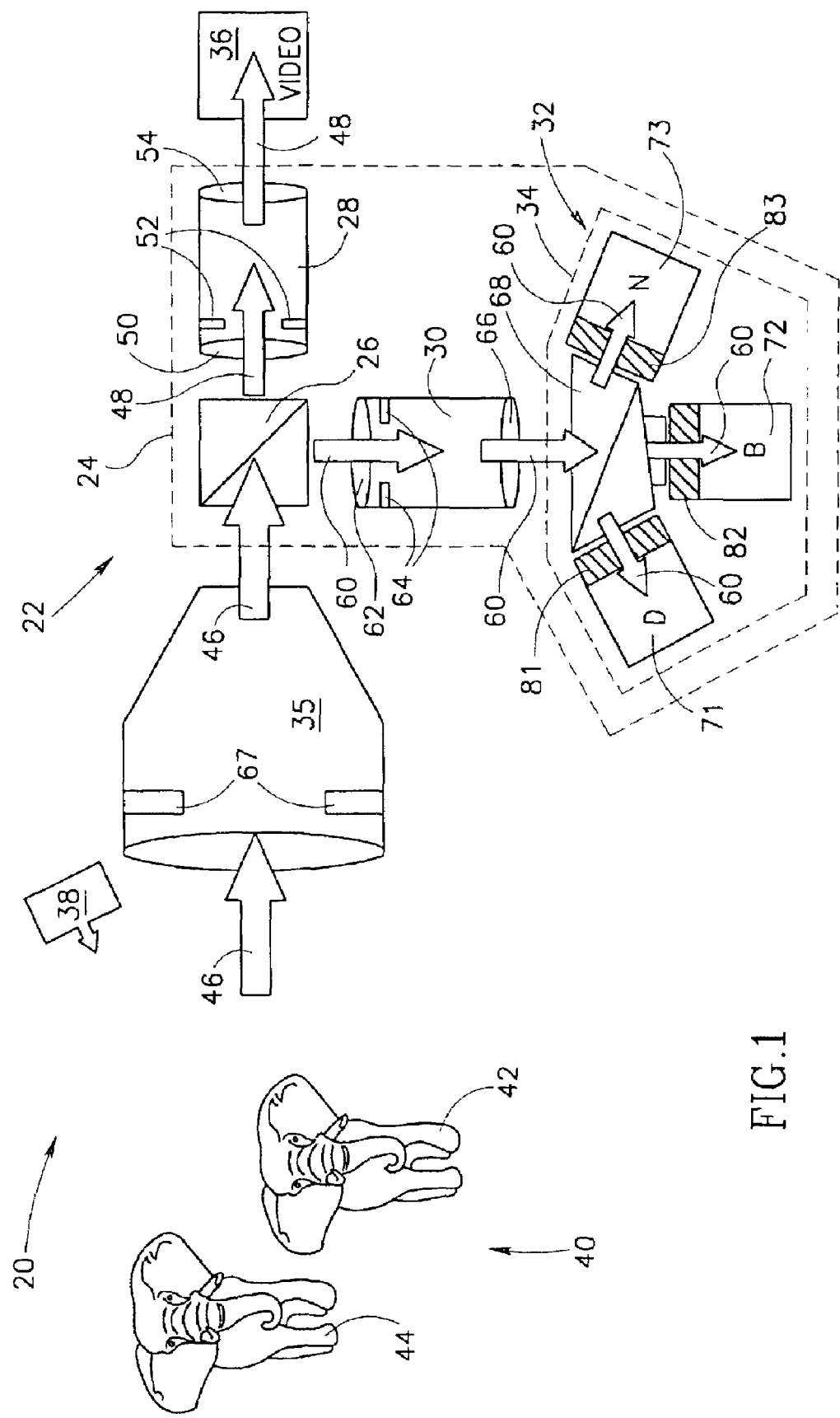
FIG. 1 schematically shows a 3D imager comprising a 3D module, in accordance with a preferred embodiment of the present invention.

FIG. 1 schematically shows a 3D imager 20 comprising a 3D module 22, in accordance with a preferred embodiment of the present invention, shown inside dashed boundary 24. 3D module 22 comprises a beam splitter 26, two refocusing lens system 28 and 30, referred to as "refocusers" 28 and 30, and a 3D camera 32 having components shown inside a dashed boundary 34. 3D module 22 is coupled to a taking lens system 35 and an imaging camera 36, which is shown by way of example as a video camera. Preferably, video camera 36 is a color video camera. Taking lens 35 and video camera 36 may be any suitable taking lens and video camera, for example a CCD or CMOS camera, readily available on the commercial market. A pulsed light source 38 radiates pulse trains of, preferably IR light pulses, to illuminate scenes being imaged with 3D imager 20. 3D imager 20 is shown, by way of example, imaging a scene 40 having two elephants 42 and 44.

Visual light and IR light from IR source 38 that is reflected from scene 40 and collected by taking lens 35 is represented by large arrows 46. Collected light 46 is transmitted by taking lens 35 to beam splitter 26. Visual light, represented by arrows 48, in collected light 46, is transmitted by beam splitter 26 and enters refocuser 28. Refocuser 28 generally comprises a field lens 50, an iris 52 and a relay lens 54. Refocuser 28 is boresighted with taking lens 35 and preferably positioned so that an image of scene 40 formed by taking lens 35 from visual light 48 is located substantially at the location of field lens 50. Light from field lens 50 passes through iris 52 and continues towards relay lens 54, which transmits the light to video camera 36. Video camera 36 is boresighted with refocuser 28 and taking lens 35. The amount of light received by video 36 from refocuser 28 is controlled by iris 52. Received visual light 48 is imaged by video 36 to form a picture of scene 40.

IR light, represented by dashed arrows 60, in collected light 46 that is incident on beam splitter 26 is reflected by beam splitter 26 to refocuser 30, which is boresighted with taking lens 35. Refocuser 30 is generally similar to refocuser 28 and preferably comprises a field lens 62, an iris 64 and a relay lens 66. Refocuser 30 is preferably positioned so that an image of scene 40 formed in IR light 60 by taking lens 35 is located at the location of field lens 62. Refocuser 30 transmits IR light that it receives towards 3D camera 32 which is boresighted with refocuser 30 and taking lens 35. The amount of IR light 60 transmitted by refocuser 30 to 3D camera 32 is controlled by iris 64.

Irises 52 and 64 are controllable independently of each other and therefore enable the amounts of IR and visual light reaching 3D camera 32 and video camera 36 respectively to be controlled independently of each other, in accordance with a preferred embodiment of the present invention. 3D imager 20 therefore can easily be adjusted to simultaneously optimize the amounts of IR light reaching 3D camera 32 and visual light reaching video camera 36 from taking lens 35 to provide simultaneous quality depth maps and pictures of scene 40.

It is to be noted that commercially available taking lenses are generally supplied with an iris and taking lens 35 is shown with an iris 67. In operation of 3D imager 20, iris 67 is preferably permanently set to maximum open and the amounts of light reaching 3D camera 32 and video camera 36 are controlled by irises 64 and 32 respectively. However, in some preferred embodiments of the present invention iris 67 is used in place of one of irises 52 or 62. For example, generally a greater fraction of IR light collected by taking lens 35 is needed to produce a quality depth map of a scene than the fraction that is needed of visible light collected by taking lens 35 to provide a quality picture of the scene. As a result, iris 67 may conveniently be used in place of iris 64 to modulate IR light reaching 3D camera 32.

3D camera 32 preferably comprises a three-way prism 68 and preferably three photosurfaces 71, 72 and 73. Three-way prism 68 receives IR light 60 transmitted from refocuser 30 and directs portions of the received IR light to each of photosurfaces 71, 72 and 73. Photosurfaces 71, 72 and 73 are respectively shuttered by fast shutters 81, 82 and 83. Fast shutters 81, 82 and 83, and fast shutters in other preferred embodiments of the present invention, are preferably either gated image intensifiers or fast solid state shutters of a type described in above cited PCT patent application PCT/IL98/00060. In some preferred embodiments of the present invention in which 3D photosurfaces are shuttered individually by their own fast shutters, as are photosurfaces 71, 72 and 73, the shutters are comprised in the photosurfaces. Photosurfaces that comprise shuttering apparatus are described in PCT patent application PCT/IL98/00476 cited above. A controller (not shown) controls shutters 81, 82 and 83.

Photosurfaces 71, 72 and 73 function respectively as a distance photosurface, a background photosurface and a normalization photosurface and are labeled accordingly "D", "N" and "B" in FIG. 1. The choice of which photosurface 71, 72 or 73 is a distance, background or normalization photosurface is arbitrary and the choices shown in FIG. 1 are choices of convenience. The controller controls shutters 81, 82 and 83 to gate photosurfaces 71, 72 and 73 following each IR pulse radiated by IR source 38 with a sequence of gates similar to prior art gate sequences used in gated 3D cameras. Prior art gating sequences are described in above cited references PCT Publications WO 97/01111, WO 970112, WO 97/01113, U.S. Pat. No. 5,434,612 and PCT Application PCT/IL98/00476.

Whereas, in the preceding paragraph it is implied that photosurfaces 71, 72 and 73 are similar or substantially identical, and this is generally the case, in some preferred embodiments of the present invention, different ones of the photosurfaces in 3D camera 32 are different. For example, a photosurface used to measure background light or normalization light may have a lower resolution than a resolution of a photosurface used as a distance photosurface and this can be advantageous.

Shutter 81 is controlled to respectively gate distance photosurface 71 with a relatively short gate and normalization photosurface 73 with a relatively long gate. Preferably the short gate has a gate width that is equal to the pulse width of IR pulses radiated by pulsed IR source 38. Preferably the time centers of the short gates and long gates coincide. The controller preferably controls shutter 83 to gate background photosurface 72 with a short gate. The short gate of background photosurface 72 is timed to occur when no IR light from pulsed IR source 38 that is reflected from scene 40 is incident on taking lens 35. Preferably the short gates of distance photosurface 71 and background photosurface 72 are equal. During the short gate of background photosurface 72, substantially only background light and dark current effects are registered by background photosurface 72.

The amounts of light registered on pixels of distance photosurface 71, background photosurface 72 and normalization photosurface 73 are sensed and transmitted to a processor (not shown) using methods known in the art and processed as in prior art to provide a depth map of scene 40.

Photosurfaces comprised in 3D cameras and imaging cameras that are used in 3D imagers, in accordance with preferred embodiments of the present invention, are preferably homologous. Two photosurfaces are said to be homologous if there is a one to one mapping of regions of one of the photosurfaces onto the other and the positions of any two regions that map onto each other are similar in their respective photosurfaces.

Figure 2A:
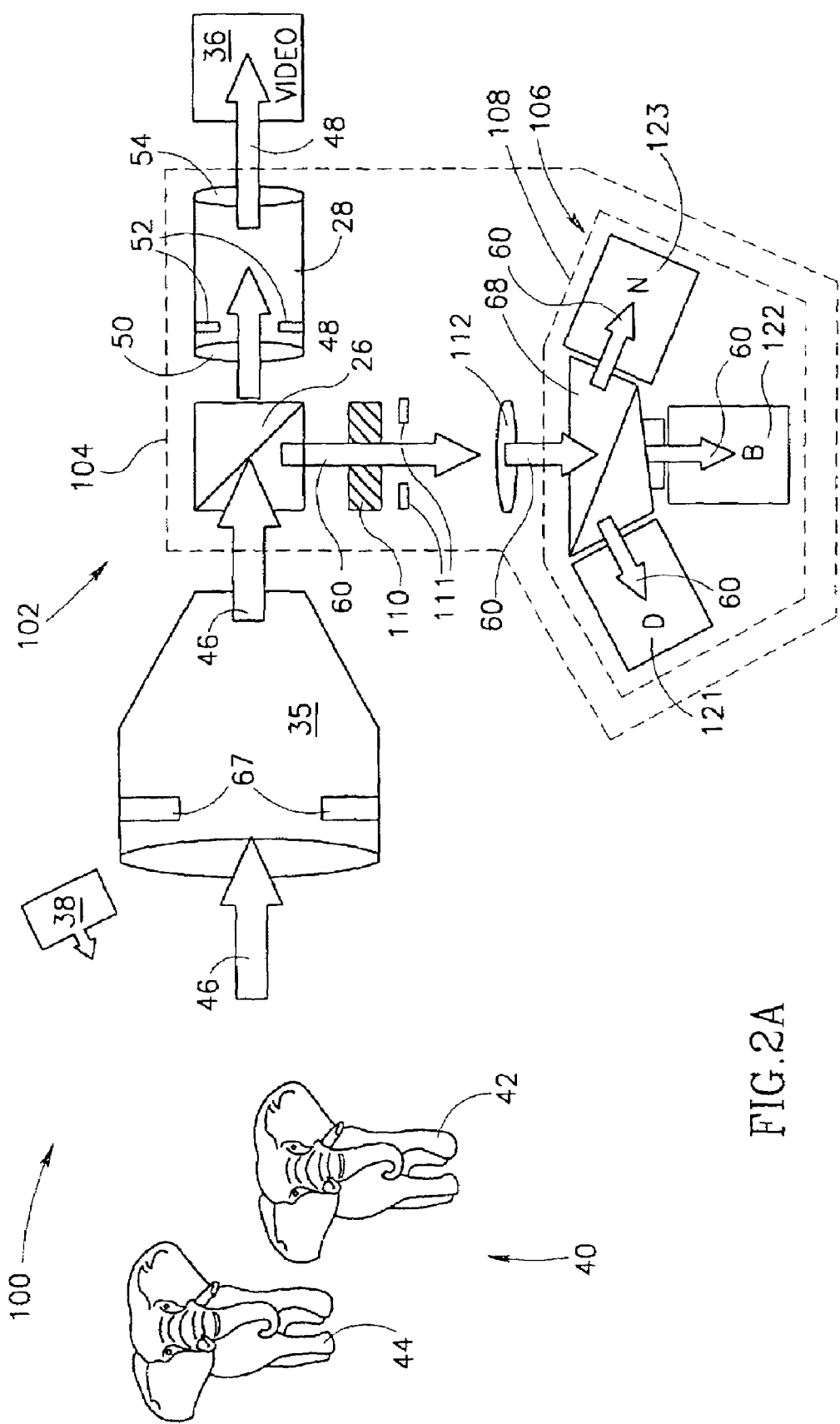
FIG. 2A schematically shows a 3D imager comprising a 3D module, in accordance with a preferred embodiment of the present invention.

FIG. 2 shows another 3D imager 100 imaging scene 40. 3D imager 100 comprises a 3D module 102 optically coupled to taking lens 35 and video camera 36.

3D module 102, having components shown inside dashed boundary 104, is similar to 3D module 22. 3D module 102 comprises beam splitter 26 and refocuser 28 that transmits visual light 48 from taking lens 35 to video camera 36, which generates a picture of scene 40 responsive to the visual light that it receives. 3D module 102 comprises a 3D camera 106 having components shown inside dashed boundary 108.

However, unlike 3D module 22, 3D module 22 does not comprise a refocuser 30 that irises and transmits IR light from beam splitter 26 to 3D camera 106. Instead, IR light 60 from beam splitter 26 passes through a fast shutter 110 and a relay lens 112 that directs the IR light to 3D camera 106. Preferably, an iris 111 controls the amount of light from taking lens 35 transmitted to 3D camera 106. 3D camera 106 is similar to 3D camera 32 shown in FIG. 1 and comprises a three-way prism 68 that directs portions of IR light 60 incident on three-way prism 68 to a distance photosurface 121, a background photosurface 122 and a normalization photosurface 123. However, unlike photosurfaces 71, 72 and 73 in 3D camera 32, Photosurfaces 121, 122 and 123 are not individually gated by their own fast shutters as are photosurfaces 71, 72 and 73 in 3D camera 32. Fast gating for all photosurfaces 121, 122 and 123 is done by fast shutter 110, which is common to all photosurfaces 121, 122 and 123. Photosurfaces 121, 122 and 123 are turned on and off to determine which photosurface registers light during a gate of fast shutter 110. Preferably, only one photosurface is turned on during a gate of fast shutter 110.

Fast shutter 110 is controlled by a controller (not shown) to be gated open with a sequence of short and long gates in synchrony with IR pulses radiated by IR source 38. Preferably, two sequential short gates having a same gate width follow every other IR light pulse in a train of light pulses radiated by IR light source 38 to illuminate scene 40. Preferably, a long gate follows every IR pulse that is not followed by the two sequential short gates.

During the first short gate, IR light reflected from scene 40 is collected by taking lens 35 and transmitted to 3D camera 106 and only distance photosurface 121 is turned on. Only distance photosurface 121 registers amounts of light incident on 3D camera 106 during the first short gate. The amount of reflected IR light registered on distance photosurface 121 from a region of scene 40, compared to the total amount of reflected IR light reaching taking lens 35 from the region is useable to determine the distance of the region from 3D camera 106.

The timing of the first short gate with respect to an IR light pulse from which reflected light is registered by distance photosurface 121 and the gate width of the short gate, determine a center for a range of distances for which 3D camera 106 can provide distance measurements to regions in scene 40. The width of the range is determined by the pulse width of the IR pulses and the gate width of the short gate.

The second short gate is timed to occur when no IR light reflected from scene 40 reaches taking lens 35. During the short gate only background light is collected by taking lens 35 and transmitted to 3D camera 106. Only background photosurface 122 is turned on and registers light incident on 3D camera 106. Background photosurface 106 exclusively acquires background light information from scene 40.

The time centers of the long gates and the first short gates are preferably delayed by the same time with respect to their respective IR light pulses. During the long gates, only normalization photosurface 123 is turned on. Normalization photosurface 123 registers amounts of IR light that are responsive to total amounts of reflected IR light reaching taking lens 35 from regions of scene 40.

It should be noted that, while photosurfaces 121, 122 and 123 are turned on and off to gate 3D camera 106, gating of 3D camera 106 for accurate distance measurements cannot be accomplished without fast gate 110 and only by turning on and off photosurfaces 121, 122 and 123. Accurate distance measurement require that photosurfaces 121, 122 and 123 be gated on and off in times on the order of nanoseconds or less. Photosurfaces such as CCD photosurfaces can generally be turned on and off in times on the order of microseconds.

However, whereas turning photosurfaces on and off can not generally be used for fast shuttering of photosurfaces, it can be used for irising photosurfaces. For example, a photosurface in some video cameras can be turned off for a fraction of a frame time to control an amount of light that the photosurface registers. In some preferred embodiments of the present invention irising of an imaging camera is accomplished by controlling the length of time that a photosurface comprised in the imaging camera is on during a frame time.

As in prior art, amounts of light registered on pixels of distance photosurface 121 are corrected for background and normalized using amounts of light registered on corresponding pixels of on background photosurface 122 and normalization photosurface 123. The corrected and normalized amounts of light are used to determine distances to reflecting regions of scene 40, in this case, by way of example distances to elephants 42 and 44.

Figure 2B:
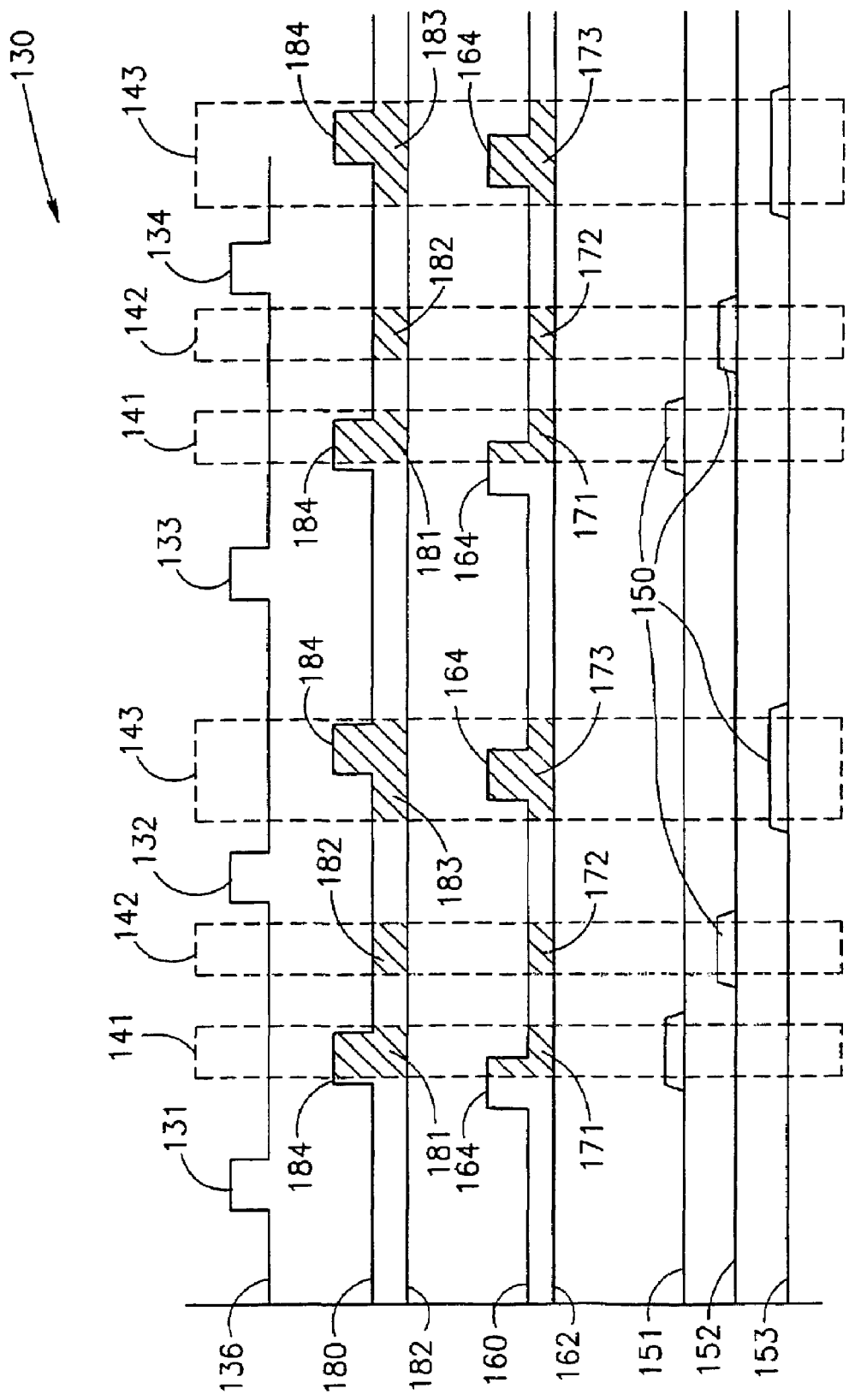
FIG. 2B shows a timing diagram for shuttering photosurfaces comprised in the 3D imager shown in FIG. 2A, in accordance with a preferred embodiment of the present invention.

FIG. 2B shows, as function of time, a graph 130 of gates of fast shutter 110 and associated periods of time, hereinafter referred to as "on times" during which photosurfaces 121, 122 and 123 are turned on, in accordance with a preferred embodiment of the present invention. The gates and on times are shown by way of example synchronized with four IR pulses, represented by rectangles 131, 132, 133 and 134 on a time line 136, of a pulse train of IR pulses radiated by IR source 38 shown in FIG. 2A to illuminate scene 40. The choice of four IR pulses in the train of pulses is by way of example only and is a choice of convenience.

The gates of fast gate 110 are represented by dashed rectangles 141, 142 and 143. Gates 141 are short "distance gates" and gates 142 are short "background gates". A distance gate 141 and a background gate 142 follow every other IR pulse (the odd numbered IR pulse in FIG. 2B) in the pulse train radiated by IR source 38. Gates 143 are long "normalization" gates that preferably follow every IR pulse (the even numbered IR pulses in FIG. 2B) that is not followed by a distance gate 141 and a background gate 142.

The on time of distance, background and normalization photosurfaces 121, 122 and 123 are shown as trapezoids 150 on timelines 151, 152 and 153 respectively. Distance photosurface 121 is on only during short distance gates 141. Background photosurface 122 is on only during short background gates 142 and normalization photosurface 123 is on only during long normalization gates 143. The sloped side edges of the trapezoids indicate the relatively long periods of time required to turn on and off a photosurface compared to the short turn-on and turn-off times required to gate photosurfaces quickly enough to provide accurate distance measurements.

An intensity of light received by taking lens 35 from elephant 42 as a function of time is represented by the height of an "intensity" line 160 above a base line 162. Rectangular "peaks" 164 in the height of intensity line 160 occur when IR light reflected from an IR pulse by elephant 42 reaches taking lens 35. The height of intensity line 160 outside of peaks 164 represents background light received from elephant 42. Amounts of light received from elephant 42 that are registered by photosurfaces 121, 122 and 123 during gates 141, 142 and 143 are represented by shaded areas 171, 172 and 173 respectively.

Similarly, an intensity of light received by taking lens 35 from second elephant 44 as a function of time is represented by the height of an intensity line 180, which has IR "reflection peaks" 184, above a base line 182. Shaded areas 181, 182, and 183 represent amounts of light from second elephant 44 registered by photosurfaces 121, 122 and 123 during gates 141, 142 and 143 respectively.

For elephant 42, background corrected light registered by distance photosurface 121 is represented by an area equal to the sum of the areas 171 minus the sum of areas 172. Background corrected light registered by normalization photosurface 123 is represented by an area equal to the sum of areas 173 minus the product of the ratio of the gate width of long gates 143 to the gate width of short gates 142 times the sum of areas 173. For elephant 44, background corrected light registered by distance photosurface 121 is represented by an area equal to the sum of areas 181 minus the sum of areas 182. Background corrected light registered by normalization photosurface 123 for elephant 44 is represented by an area equal to the sum of areas 183 minus the product of the ratio of the gate width of long gates 143 to the gate width of short gates 142 times the sum of areas 183.

Elephant 44 is further away from 3D imager 100 than elephant 42. As a result, the amount of background corrected light registered by distance photosurface 121 normalized to background collected light registered by normalization photosurface 123 is less for elephant 44 than for elephant 42.

Figure 3:
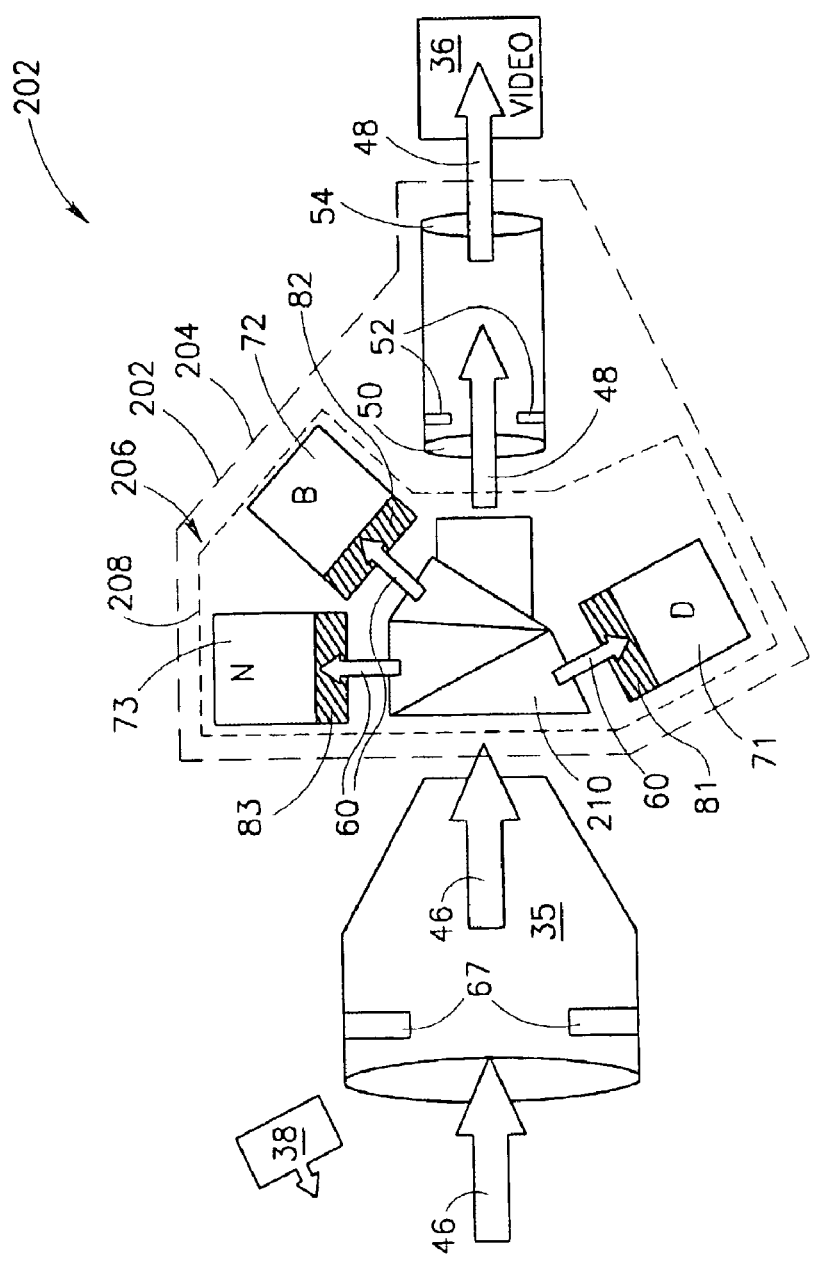
FIG. 3 schematically shows a 3D imager comprising a 3D module, in accordance with a preferred embodiment of the present invention.
Figure 3:
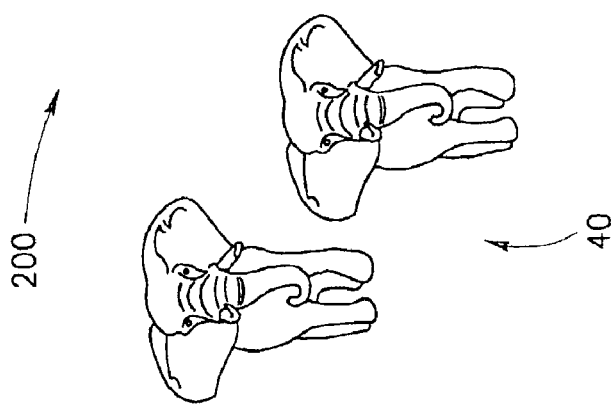

FIG. 3 shows another 3D imager 200 imaging scene 40, in accordance with a preferred embodiment of the present invention.

Imager 200 comprises a 3D module 202 having components shown inside dashed border 204, which is coupled to taking lens 35 and video camera 36. 3D module 202 comprises a 3D camera 206 having components shown inside dashed border 208. 3D camera 206 comprises a four-way prism 210 that directs portions of IR light 60 in light 46 that is collected by taking lens 35 from scene 40 to distance, background and normalization photosurfaces 71, 72 and 73 respectively. Each of photosurfaces 71, 72 and 73 is gated by its own fast shutter 81, 82 and 83 respectively. Photosurfaces 71, 72 and 73 are gated similarly to the manner in which photosurfaces 71, 72 and 73 comprised in 3D camera 206, shown in FIG. 1, are gated. Amounts of IR light 60 collected by taking lens 35 that reaches 3D camera 206 is controlled by iris 67 comprised in taking lens 35.

Four-way prism 210 also directs visual light 48 in light 46 collected by taking lens 35 to a refocuser 28 that preferably comprises a field lens 50 an iris 52 and a relay lens 54. Refocuser 28 transmits visual light 48 that it receives from four-way prism 210 to video camera 36.

Figure 4:
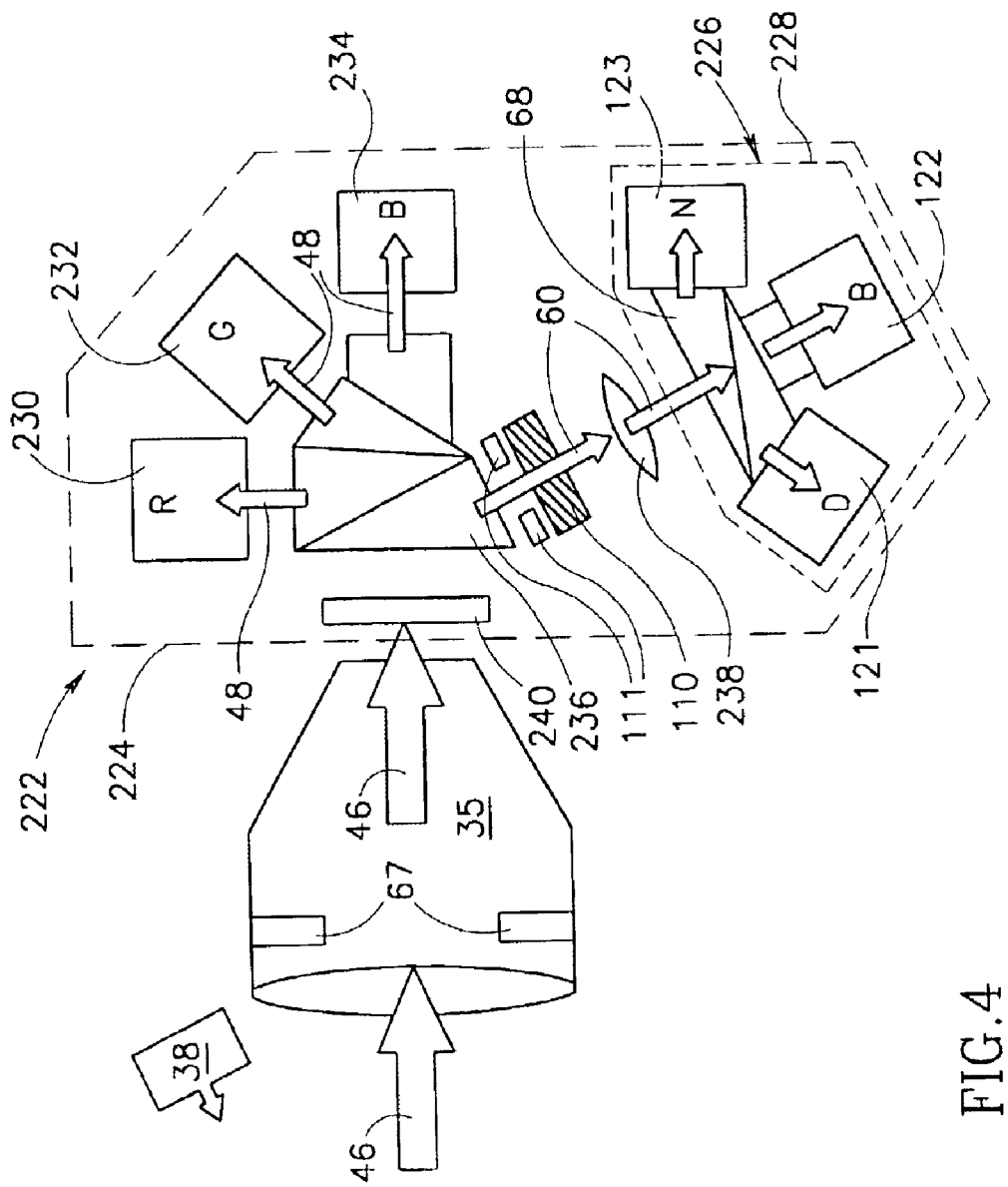
FIG. 4 schematically shows a 3D imager comprising a 3D module and color imager integrated in a single unit, in accordance with a preferred embodiment of the present invention.
Figure 4:
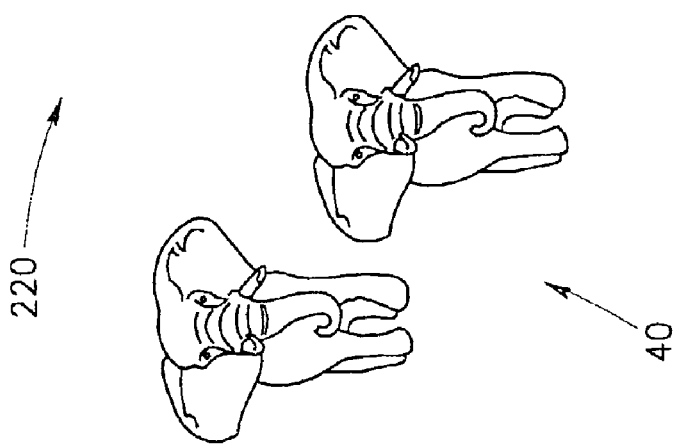

FIG. 4 schematically shows another 3D imager 220 imaging scene 40 in accordance with a preferred embodiment of the present invention. 3D imager 220 comprises a unit 222, hereinafter referred to as a "combination unit", having components located within a border 224. Combination unit 222 comprises a 3D camera 226 having components shown inside a dashed boundary 228 and three color cameras, a Red (R) camera 230 a Green (G) camera 232 and a Blue (B) camera 234. Combination unit 222 is coupled to a taking lens 35, which is boresighted with 3D camera 226 and color cameras 230, 232 and 234.

Combination unit 222 comprises a four-way prism 236 that directs visual light 48 collected by taking lens 35 to each of color cameras 230, 232 and 234 and IR light 60 collected by taking lens 35 to a fast shutter 110 that shutters 3D camera 226. Preferably, combination unit 222 comprises an iris 111 that controls the amount of light 60 transmitted from taking lens 35 to 35D camera 226. IR light 60 that fast shutter 110 transmits is incident on a relay lens 238 that relays the light to a three-way prism 68, which directs portions of the IR light 60 that it receives to a distance photosurface 121, a background photosurface 122 and a normalization photosurface 123. 3D camera 226 is substantially the same as 3D camera 106 shown in FIG. 2A and is gated by controlling fast shutter 110 and photo surfaces 121, 122, and 123 in the same manner in which 3D camera 106 is gated.

Whereas combination unit 22 is shown comprising a 3D camera in which all the photosurfaces are shuttered by single shutter, in some preferred embodiments of the present invention, combination unit 222 comprises a 3D camera similar to 3D camera 32 shown in FIG. 1 in which each photosurface of the 3D camera is shuttered by its own shutter.

Combination unit 222 preferably comprises an adjustable neutral density filter 240 located between taking lens 35 and four-way prism 236. Neutral density filter 240 is chosen so that it does not substantially attenuate IR light. Neutral density filter 240 is used to control the amount of visible light 48 collected by taking lens 35 that reaches color cameras 230, 232 and 234. The amount of IR light 60 reaching 3D camera 226 is controlled by iris 67 comprised in taking lens 35.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

The present invention has been described using detailed descriptions of preferred embodiments thereof that are provided by way of example and are not intended to limit the scope of the invention. The described preferred embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. An optical imaging system comprising:
   a taking lens that collects light from a scene being imaged with the optical imaging system;
   a 3D camera comprising at least one photosurface that receives light from the taking lens simultaneously from all points in the scene and provides data for generating a depth map of the scene responsive to the light; and
   an imaging camera comprising at least one photosurface that receives light from the taking lens and provides a picture of the scene responsive to the light; and
   a light control system that controls an amount of light from the taking lens that reaches at least one of the 3D camera and the imaging camera without affecting an amount of light that reaches the other of the 3D camera and the imaging camera.

2. An optical imaging system according to claim 1 wherein the 3D camera and the imaging camera are boresighted with the taking lens.

3. An optical imaging system according to claim 1 wherein the at least one photosurface of the 3D camera and the at least one photosurface of the imaging camera are homologous.

4. An optical imaging system according to claim 1 wherein the light control system comprises a light controller adjustable to control the amount of light from the taking lens that reaches the imaging camera without affecting the amount of light from the taking lens that reaches the 3D camera.

5. An optical imaging system according to claim 4 wherein the light controller comprises an iris.

6. An optical imaging system according to claim 4 wherein the light controller comprises a neutral density filter.

7. An optical imaging system according to claim 1 wherein the light control system comprises a light controller adjustable to control the amount of light collected by the taking lens that enters the imaging system.

8. An optical imaging system according to claim 7 wherein the light controller that controls the amount of light collected by the taking lens that enters the imaging system comprises an iris.

9. An optical imaging system according to claim 1 and comprising a light controller adjustable to control the amount of light from the taking lens that reaches the 3D camera without affecting the amount of light from the taking lens that reaches the imaging camera.

10. An optical imaging system according to claim 9 wherein the light controller that controls the amount of light from the taking lens that reaches the 3D camera comprises an iris.

11. An optical imaging system according to claim 1 wherein the 3D camera is a gated 3D camera.

12. An optical imaging system according to claim 11 and comprising a pulsed light source that radiates a train of light pulses to illuminate a scene being imaged with the optical imaging system.

13. An optical imaging system according to claim 12 wherein the pulsed light source radiates IR light.

14. An optical imaging system according to claim 11 wherein the 3D camera comprises at least 2 photosurfaces.

15. An optical imaging system according to claim 14 wherein the 3D camera comprises a light guide that receives light from the taking lens and directs portions of the light that it receives to each of the at least two photosurfaces.

16. An optical imaging system according to claim 15 and comprising a single shutter, which when gated open enables light from the taking lens to reach the light guide.

17. An optical imaging system according to claim 16 and comprising a controller that gates the single shutter open and closed.

18. An optical imaging system according to claim 17 wherein the controller controls each of the photosurfaces to be activated and deactivated and wherein when a photosurface is activated, it is sensitive to light incident thereon.

19. An optical imaging system according to claim 18 wherein each time that the controller gates on the single shutter it activates one and only one of the at least two photosurfaces.

20. An optical imaging system according to claim 19 wherein the at least two photosurfaces comprises three photosurfaces.

21. An optical imaging system according to claim 20 wherein following a time that at least one light pulse is radiated, the controller gates on the single shutter for a first gate and turns on a first photosurface and wherein the first gate is timed so that light reflected from the at least one light pulse by a region in the scene is registered by the first photosurface.

22. An optical imaging system according to claim 21 wherein following a time that at least one light pulse in the train of light pulses is radiated, the controller gates on the single shutter for a second gate and activates a second one of the photosurfaces and wherein the second gate is timed so that during the second gate no light from the at least one light pulse reflected by the region is registered by the second photosurface.

23. An optical imaging system according to claim 22 wherein following a time that at least one light pulse in the train of light pulses is radiated the controller gates on the single shutter for a third gate and activates a third one of the photosurfaces and wherein the controller controls the gate width and timing of the third gate so that during the third gate substantially all light from the at least one pulse that is reflected by the region, which is collected by the taking lens, is registered by the third photosurface.

24. An optical imaging system according to claim 15 wherein the light guide is a three-way prism.

25. An optical imaging system according to claim 1 and comprising a beam splitter that receives light from the taking lens and directs a portion of the received light towards the 3D camera and a portion of the received light to the imaging camera.

26. An optical imaging system according to claim 7 wherein the light guide is a four-way prism that receives light from the taking lens and directs a portion of the received light to the imaging camera.

27. An optical imaging system according to claim 1 wherein the imaging camera comprises a color camera.

28. An optical imaging system according to claim 1 wherein the imaging camera is a color camera comprising separate R, G and B photosurfaces and comprising a four way prism that receives light from the taking lens and directs a portion of the received light to each of the R, G and B photosurfaces and to the single shutter of the 3D camera.

* * * * *